(12) United States Patent
West et al.

(10) Patent No.: US 6,748,045 B2
(45) Date of Patent: Jun. 8, 2004

(54) MEASUREMENT OF WOOD/PLANT CELL OR COMPOSITE MATERIAL ATTRIBUTES WITH COMPUTER ASSISTED TOMOGRAPHY

(75) Inventors: Darrell C. West, Lenoir City, TN (US); Michael J. Paulus, Knoxville, TN (US); Gerald A. Tuskan, Oak Ridge, TN (US); Rupert Wimmer, Vienna (AT)

(73) Assignee: UT-Battelle, LLC, Oak Ridge, TN (US)

( * ) Notice: Subject to any disclaimer, the term of this patent is extended or adjusted under 35 U.S.C. 154(b) by 15 days.

(21) Appl. No.: 10/029,098

(22) Filed: Dec. 20, 2001

(65) Prior Publication Data

US 2002/0080914 A1 Jun. 27, 2002

Related U.S. Application Data

(63) Continuation-in-part of application No. 09/496,879, filed on Feb. 2, 2000.

(51) Int. Cl.⁷ .......................................... G01N 23/083
(52) U.S. Cl. ................. 378/8; 378/4; 378/901
(58) Field of Search ................. 378/4, 8, 15, 961

(56) References Cited

U.S. PATENT DOCUMENTS

| | | | | |
|---|---|---|---|---|
| 4,833,698 A | * | 5/1989 | Flannery et al. | 378/19 |
| 4,870,279 A | * | 9/1989 | Cueman et al. | 250/368 |
| 5,259,013 A | * | 11/1993 | Kuriyama et al. | 378/43 |
| 5,402,460 A | * | 3/1995 | Johnson et al. | 378/10 |
| 5,493,593 A | * | 2/1996 | Muller et al. | 378/19 |
| 6,597,761 B1 | * | 7/2003 | Garms, III | 378/58 |

OTHER PUBLICATIONS

M. L. Parker and R. W. Kennedy, "*The Status of Radiation Densitometry for Measurement of Wood Specific Gravity*", Proc. Int. Union For. Res. Organ, Cape Town, Africa, 1973, pp. 882–893.

Tuskan, et al. "*Two High. Throughput Techniques for Determining Wood Properties as Part of a Molecular Genetics Analysis of Hybrid Poplar and Loblolly Pine*", Applied Biochemistry and Biotechnology, vol. 77–79, 1999, pp. 55–65.

Palus, et al., U.S. patent application No. 09/496,879, "*Ultra–High Resolution Computed Tomography Imaging*".

Paulus, et al., U.S. patent application No. 09/496,880, "*Simultaneous CT and SPECT Tomography Using CZT Detectors*".

* cited by examiner

*Primary Examiner*—David V Bruce
(74) *Attorney, Agent, or Firm*—Akerman Senterfitt

(57) ABSTRACT

A method for obtaining wood-cell attributes from cellulose containing samples includes the steps of radiating a cellulose containing sample with a beam of radiation. Radiation attenuation information is collected from radiation which passes through the sample. The source is rotated relative to the sample and the radiation and collecting steps repeated. A projected image of the sample is formed from the collected radiation attenuation information, the projected image including resolvable features of the cellulose containing sample. Cell wall thickness, cell diameter (length) and cell vacoule diameter can be determined. A system for obtaining physical measures from cellulose containing samples includes a radiation source, a radiation detector, and structure for rotating the source relative to said sample. The system forms an image of the sample from the radiation attenuation information, the image including resolvable features of the sample.

48 Claims, 4 Drawing Sheets

| Parameter | Value |
|---|---|
| X-ray tube focal spot size (μm-FWHM) | 12 |
| Detector pixel spacing (μm) | 50 |
| Phosphor screen resolution (μm) | 70 |
| X-ray source-to-object distance, $d_s$, (mm) | 10 |
| X-ray source-to-detector distance, $d_d$, (mm) | 200 |
| Beam angle (degrees) | 14.3 |
| Image resolution (μm-FWHM) | 12 |
| Minimum detectable feature (μm) | 7 |
| Field of view (mm) | 2.5 |

FIG. 2

Simulated image blurring of a rectangular grid structure
(a) no blurring (full resolution); (b) image resolution approximately twice the grid wall thickness; (c) image resolution approximately four times the grid thickness.

Cells per unit length

Rows per unit length

Vacuole diameter

Cell size

MEASUREMENT OF WOOD/PLANT CELL OR COMPOSITE MATERIAL ATTRIBUTES WITH COMPUTER ASSISTED TOMOGRAPHY

CROSS-REFERENCE TO RELATED APPLICATIONS

This application is a Continuation-In-Part of application Ser. No. 09/496,879 filed Feb. 2, 2000 entitled ULTRA-HIGH RESOLUTION COMPUTED TECHNOLOGY IMAGING.

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

This invention relates generally to a method and apparatus for obtaining physical measures of microscopic features using tomography.

BACKGROUND OF THE INVENTION

In pine and hardwood tree species, which are frequently used for pulp, paper and forest products, plant cells form cells, the cells having a cell wall surrounded by an empty vacuole. Plant cells typically vary in diameter from approximately 10 to 50 $\mu$m. During an annual growth cycle, large-diameter, thin-walled cells are produced at the beginning of the growing season, while smaller-diameter, thicker-walled cells are produced near the end of the growing season, thus producing annual rings. In addition to variation within growth for a given year, wood cell anatomy varies from year to year. The wood formed during the earlier years of growth and near the crown of a tree is considered to be juvenile wood and typically has a lower density and shorter, thinner-walled fibers compared to mature wood. Because final paper and/or lumber quality is determined primarily by cell wall attributes, the ability to measure and separate materials having differing physical measures represents a method for improving wood quality by providing paper and/or lumber having optimized physical properties based on the intended application.

Cell length, diameter, and wall thickness are important parameters in assessing wood quality. Cell structure is a major reason for the visual differences that can be observed in various wood products. Surface texture of cardboard, newsprint, and fine writing paper is related partially to differences in physical cell dimensions. Likewise, in pieces of furniture made from different species of wood such as oak and pine, differences in appearance, durability, and weight can be attributed to microscopic features of wood cells. In general, for pulp and paper processing, the optimal characteristics are longer cells with thicker walls for Kraft paper as used for grocery bags and cardboard boxes and shorter lengths and thinner walls for fine writing paper. Even though product quality is determined by cell quality, little progress has been made in improving such traits because of the time and expense associated with current assessment methods. It has been estimated that optimizing average cell characteristics for a single species, loblolly pine (*Pinus taeda*), could affect 17 million acres of crop production and an annual $8 billion in raw feedstock supply to the pulp and paper industry.

During approximately the last 90 years, softwoods and hardwoods have been used for pulp and paper. These fiber types now account for 94% of the raw material for paper production. The rapid determination of wood-cell morphology could improve the effectiveness of forest genetic-selection studies.

Cell length and cell wall thickness measurements are currently determined using standard visual microscopic techniques. However, sample preparation during traditional cell wall thickness studies requires several meticulous laboratory steps, generally including softening and maceration of the wood and microscope slide preparation. Such preparations generally inadvertently affect the obtained physical measures. In addition to being cumbersome, cell length data obtained by the traditional microscopic methods contains errors because it includes measurements of truncated cells damaged from the preparation process. Furthermore, large sample-preparation and data-analysis time requirements limit the usefulness of the traditional microscopic cell size determination procedure in genetic selection studies in which hundreds of samples need to be processed as quickly as possible.

The use of direct and film X-ray densitometry for wood-density measurements has been reported (Parker, M. L. and Kennedy, R. W., "The status of radiation densitometry for measurement of wood specific gravity." Proc. Int. Union For. Res. Organ, p. 17, Cape Town, Africa, 1973). In this work, an X-ray film is used to gather attenuation data derivable through analysis of the resulting degree of film darkness from X-rays passing through a sample. Using this method, the wood sample must have a substantially uniform thickness. Otherwise, the attenuation data will contain a false signal component associated with variations in thickness of the sample.

The Oak Ridge National Laboratories (ORNL) has recently improved upon the standard densitometry method by eliminating X-ray film through the use of a commercially manufactured X-ray computed tomography (CT) system. The technique provides a method and system for obtaining density profiles in up to 2-dimensions of wood samples with an improved resolution being approximately 158 microns (Tuskan et al. 1999, entitled "Two High-Throughput Techniques for Determining Wood Properties as Part of a Molecular Genetics Analysis of Hybrid Poplar and Loblolly Pine," Applied Biochemistry and Biotechnology, vol. 77–79, pages 55–65). The advantages of the CT method for wood analysis include the elimination of the requirement for sample preparation because of the ability to correct for thickness variation, the opportunity for digital data analysis and interpretation, and the reduction in the time of data acquisition to less than ten percent of that required by the non CT X-ray method. Data acquisition is speeded because of electronic data assembly, minimal or no sample preparation and no need for secondary darkness measures.

Thus, X-ray CT-based densitometry represents an improvement over traditional microscopic or X-ray film densitometry methods for density determinations of wood and wood composite samples. However, the spatial resolution the X-ray CT system described by Tuskan et al. is insufficient to permit measurement of structures having feature sizes on the order of several microns, such as cell length and cell wall thickness in wood and wood products.

SUMMARY OF THE INVENTION

A method for obtaining wood-cell attributes from cellulose containing samples includes radiating a cellulose containing sample with a beam of radiation. The radiation can be selected from X-rays, gamma rays, neutrons, positrons or electrons, the radiation having an energy capable of passing through the sample. Radiation attenuation information is collected from radiation which passes through the sample. The source is then rotated relative to the sample. The collecting step is repeated after the rotating step, and a projected image, which includes resolvable features of the sample, is formed from the radiation attenuation information. The above image can be a tomographical image and can be a 3-dimensional image. The resolvable features in the image can be from less than approximately 100 $\mu$m to less than approximately 1 $\mu$m.

This method can further include the step of determining at least one cell dimension of the sample from the image. The cell dimensions can be cell wall thickness, cell diameter (length), or cell vacuole diameter.

The sample can be either wood or a reconstituted wood product. If the sample is a reconstituted wood product, it can be selected from strand board, fiber board, or fiber-resin wood composite products.

The invention includes a method for tomographically imaging features. A sample is radiated with a beam of radiation. The radiation can be selected from X-rays, gamma rays, neutrons, positrons or electrons, the radiation having an energy capable of passing through the sample. Radiation attenuation information is collected from radiation which passes through the sample. The source is rotated relative to the sample. The collecting step is repeated after the rotating step. A projected image, which can be a tomographical image and can be a 3-dimensional image, includes resolvable features of the sample and is formed from the radiated attenuation information. The sample can be rotated while the source remains substantially fixed.

The source can be positioned closer to the target than the target is to the detector, the detector used to form the image. The spot size of the beam of radiation can primarily determine the resolution provided by the image. Resolvable features in the image can be from less than approximately 100 $\mu$m to less than approximately 1 $\mu$m.

The invention includes a method for sorting cellulose containing products. A cellulose containing a sample is radiated with a beam of radiation. The radiation can be selected from X-rays, gamma rays, neutrons, positrons or electrons, the radiation having an energy capable of passing through the sample. Radiation attenuation information is collected from the radiation which passes through said sample. The source is rotated relative to the sample. The collecting step is repeated after the rotating step. The image can be a tomographical image and can be a 3-dimensional image. The resolvable features in the image can be from less than approximately 100 $\mu$m to less than approximately 1 $\mu$m.

The sample can be then separated into categories based on at least one resolvable feature derivable from the image. At least one cell dimension of the sample is determined from the image. The cell dimension can be the cell wall thickness, cell diameter (length), or cell vacuole diameter.

The cellulose containing sample can be either wood or a reconstituted wood product. If the sample is a reconstituted wood product, it can be strand board, fiber board, or a fiber-resin wood composite product.

The invention can include a method for detecting wood destroying insect damage by radiating a cellulose containing sample with a beam of radiation. The radiation can be selected from X-rays, gamma rays, neutrons, positrons or electrons, the radiation having an energy capable of passing through said sample. Radiation attenuation information is collected from the radiation which passes through the sample. The source is rotated relative to the sample. The collecting step is repeated after the rotating step. An image, which can be either tomographical or 3-dimensional, is formed and projected from the radiated attenuation information and includes resolvable features of said sample. The resolvable features in the image can be from less than approximately 100 $\mu$m to less than approximately 1 $\mu$m. The image can be used to determine whether the sample includes wood destroying insect damage and whether that damage is from a termite.

The cellulose containing sample can be either wood or a reconstituted wood product. If the sample is a reconstituted wood product, it can be selected from strand board, fiber board, or fiber-resin wood composite products.

The invention can also include a system for obtaining physical features from cellulose containing samples. A radiation source is provided for radiating a cellulose containing sample with a beam of radiation. The radiation can be selected from X-rays, gamma rays, neutrons, positrons or electrons, the radiation having an energy capable of passing through the sample.

A radiation detector collects radiation attenuation information from the radiation which passes through the sample. A structure for rotating source relative to the sample, wherein a projected image, which can be either tomographical or 3-dimensional, is formed from the radiated attenuation information. The image formed includes resolvable features of the sample. The resolvable features in the image can be from less than approximately 100 $\mu$m to less than approximately 1 $\mu$m.

A structure is also provided for determining at least one cell dimension of the sample from the image. The cell dimensions can be any of the cell wall thickness, cell diameter (length), or cell vacuole diameter.

The sample can be either wood or a reconstituted wood product. If the sample is a reconstituted wood product, it can be selected from strand board, fiber board, or fiber-resin wood composite products.

The invention further includes a system for tomographically imaging features. A radiation source provided radiates a cellulose containing sample with a beam of radiation. The radiation can be selected from X-rays, gamma rays, neutrons, positrons or electrons, and has an energy capable of passing through said sample.

A radiation detector collects radiation attenuation information from the radiation which passes through the sample. The sample is positioned closer to the radiation source than to the radiation detector. A structure is also provided for rotating the source relative to the sample, wherein a projected image, which can be either tomographical or 3-dimensional, is formed from the radiated attenuation information. The image includes resolvable features of the sample. The resolvable features in the image can be from less than approximately 5 $\mu$m to less than approximately 1 $\mu$m. The focal spot size of the radiation detector can be from less than approximately 10 $\mu$m to less than approximately 1 $\mu$m.

BRIEF DESCRIPTION OF THE DRAWINGS

A fuller understanding of the present invention and the features and benefits thereof will be accompanied upon review of the following detailed description together with the accompanying drawings, in which:

FIG. 2 is a table of system parameters and resulting characteristics of a tomography system which permits direct measurement of certain wood cell attributes, according to an embodiment of the invention.

DETAILED DESCRIPTION OF THE PREFERRED EMBODIMENTS

The invention is a computer assisted tomography (CT) method and apparatus adapted for measuring microscopic features in a wide variety of materials having features as small as approximately 1 µm. Applied to wood and wood products, wood cell dimensions including cell length, cell diameter and cell wall thickness of wood and plant cells can be conveniently obtained. The invention can also be used to detect microporosity in a variety of materials as well as detect defects, such as fissure or cracks, in such materials.

Applied to wood products, the invention can be used to obtain physical measures from reconstituted wood products such as oriented strand board, medium density fiber board and exuded wood products. The measured parameters can relate to product quality and product performance. The invention can be used in production settings to provide real-time quality information on wood and fiber-resin composite products. As such, the invention can be used in solid fiber production facilities, reconstituted wood product facilities, and other fiber-resin production facilities.

The invention can also be used to speed the selection of select superior genetic parent materials. This can permit elimination of the trial-and-error method commonly used when using genetic techniques to improve wood quality.

X-ray computed tomography has been used for medical applications and has also been used to analyze the structure of soil and biological samples. However, the invention represents the first time that a CT system has achieved image resolution on the order of 10 µm, with the ability to achieve resolution on the order of 1.0 µm or less depending on the focal spot size of the radiation source used. Thus, applied to wood, the invention permits the rapid, non-destructive and direct measurement of known property defining wood cell dimensions such as cell wall thickness, cell diameter, and cell vacuole diameter.

The volumetric resolution of CT systems is primarily limited by the detector resolution (e.g. pixel size), the radiation source spot size, or the combined effects of both. When the radiation source (e.g. X-ray source) is spaced farther from the target under test than is the radiation detector, the resolution is typically limited by the resolution of the detector. When the detector is spaced farther from the target than the radiation source is spaced from the target, the source spot size typically limits the resolution of the system. The latter case forms the context for best explaining the inventive arrangements and is illustrated in FIG. 1.

Figure 1:
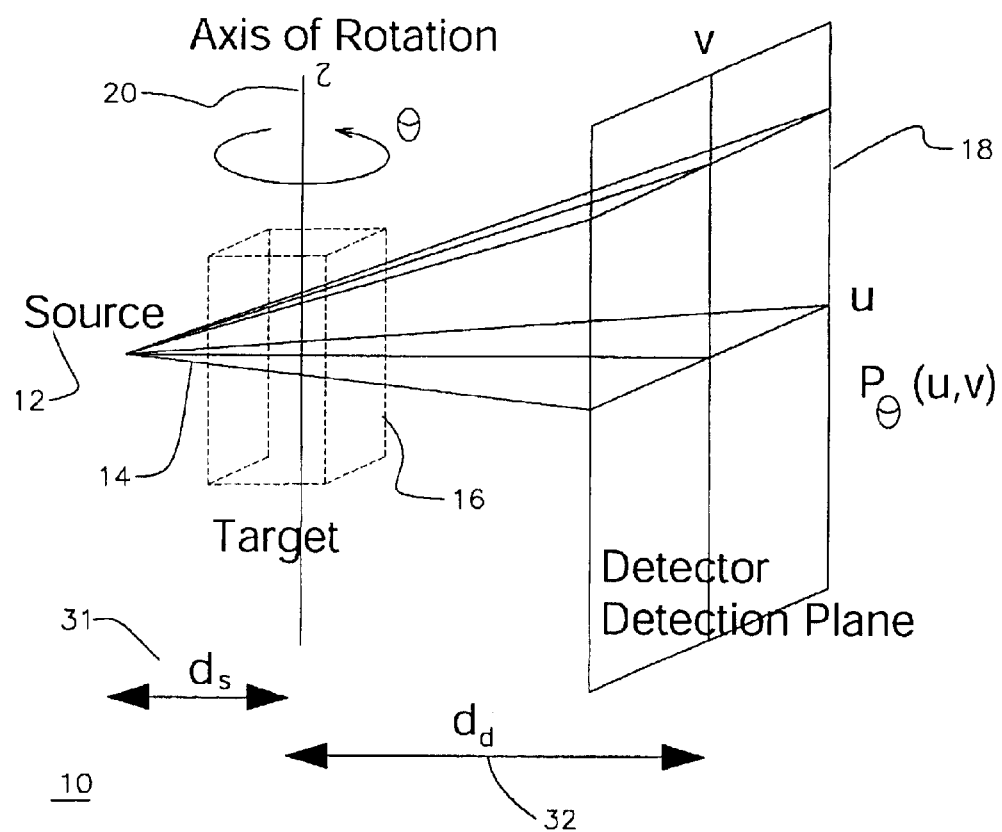
FIG. 1 illustrates a schematic representation of a X-ray tomography system showing components and system geometries which significantly affect image resolution.

Referring to FIG. 1, tomography system 10 comprises a source 12 of energetic radiation, such as X-rays or gamma rays, for example an X-ray source such as an X-ray tube. However, radiation which can be used with the invention generally includes radiation capable of passing through a target and forming an image capable of image resolution on the order of microns. For example, besides X-rays and gamma rays, neutrons, positrons, electron beams as well as other types of suitable radiation may be used with the invention. The emitted radiation 14 from source 12 is used to irradiate a target 16, which can be an object volume or a sub-volume within a target object.

Radiation 14 striking target 16 is diffracted by the target 16 and impacts a detector having a detector plane 18 in a pattern which is indicative of one or more characteristics of the target 16. The divergence of radiation 14 emitted from source 12 naturally results in a conical beam of X-rays which serves to magnify the image projected onto an area of the detection plane of detector 18, the magnification increasing with distance from target 16 to the detector 18. The magnification effect permits the use of relatively large detector elements, on the order of approximately 10 microns×10 microns, to image micron-scale features. However, it should be kept in mind that a reduction in power density of the diffracted radiation accompanies the magnification of the target image.

The distance from the target 16 to the source 12 is denoted $d_s$ 31 and the distance from the target 16 to the detection plane of detector 18 is denoted $d_d$ 32. The distance $d_s$ 31 is less than the distance $d_d$ 32 in FIG. 1. This relationship generally results in the source focal spot size becoming the resolution determining factor of system 10.

The radiation source is rotated relative to the target 16 to produce the tomographic image. As used herein, the phrase "rotating the (radiation) source relative to the sample" includes rotating the target 16 while holding the source 12 fixed, rotating source 12 (and detector 18) while holding target 16 fixed, or rotating both target 16 and source 12. Preferably, target 16 is rotated while holding source 12 and detector fixed in a given location to minimize wobble associated with component movement. Rotation of only target 16 permits the required relative rotation between source 12 and target 16 through movement of a single component (target 16).

Assuming target 16 is rotated as shown in FIG. 1, rotation of target 16 is usually through at least 180°, in order to enable a complete image of the target 16 to be generated. A rotating means 20 is represented by the axis of rotation z in FIG. 1, the arc of rotation being represented by the circular arrow and angle θ. The data acquired by detector 18 can be processed to form an image, preferably being a digital image of target 16 which can then be analyzed by an appropriate image processor in either a two-or three-dimensional space as described in detail later.

It may be possible to obtain a commercially available X-ray or other suitable radiation source having an emitted spot size on the order of 1 µm. However, if such systems are not available, focusing techniques can be used to reduce the effective spot size of the radiation source 12. For example, applied to X-rays, one or more focusing optics (not shown), such as Fresnel zone plates can be used for this purpose. Fresnel zone plates have been used previously with soft X-rays, that is, low-energy X-rays on the order of 8 keV to 20 keV. Fresnel plates typically consist of concentric circles of an absorbing material patterned on a transmitting substrate. Gold has a relatively large atomic number and thus has been frequently employed with soft X-rays. For higher energy X-ray or gamma ray radiation, materials such as tungsten or lead are often preferred. It is expected that with sufficiently thick absorbers, the thickness of which will depend on the energy of the high energy radiation such as X-rays or gamma rays, the high energy radiation can be focused to produce reduced radiation spot sizes. Image processing techniques can also be applied to further reduce the effective spot size.

Any suitable detector may be used with the invention. In a preferred embodiment detector 18 is embodied as a 30 cm detector bank of 30,000 10 $\mu$m×10 $\mu$m pixels, formed by thirty (30) 1024×1024 pixel charge coupled device (CCD) arrays. The CCD arrays are preferably coupled to a phosphor screen optimized for selected radiation, such as X-rays or gamma-rays.

Detector 18 can also be formed by a photo diode array, a scintillator array, a photo multiplier tube array or a cadmium zinc telluride semiconductor array, in a strip or pixelated configuration. Assuming an X-ray source is used, source 12 can also be a synchrotron X-ray source.

CT image generation, such as from use of X-rays, can be explained as follows. An X-ray CT can produce 2-dimensional cross-sectional images of a target specimen by acquiring a series of 1-dimensional X-ray projections from various positions around the target. Each projection is a plot of the X-ray transmission intensity (I) as a function of position on the detector surface u, such that, $$I(u) \propto \exp[-\int \mu(u, v) dv]$$

where $\mu$ is the position dependent X-ray attenuation coefficient of the target 16 and v is the axis along which the X-ray travels through the subject. Thus, an X-ray CT projection is essentially a 1-dimensional map of the average linear attenuation coefficient of the subject along the axis of the incident X-rays.

Once a family of projection data curves has been acquired, special algorithms can be employed to manipulate a plurality of simultaneous linear equations to reconstruct a 2-dimensional image or slice, for different angles of rotation between the target 16 and the source 12. A 3-dimensional X-ray CT image can be obtained by combining multiple adjacent 2-dimensional slices. An X-ray CT image scan can thus be presented as a first order volumetric map of the linear attenuation coefficient of the target material.

Preferably, the detected image can be treated as a 2-dimensional convolution of an ideal image with a transfer function due to the finite (non-zero) spot size of the source. The transfer function due to the finite source spot size can be experimentally determined, and thereafter, the blurring due to the source can be arithmetically removed, at least in part, using standard 2-dimensional image processing techniques. The deconvolution algorithm is preferably applied to each projection in the tomographic data set. The corrected projections can then be reconstructed to enhance a 3-dimensional tomographic image formed using a modified tomographic reconstruction algorithm.

A method for high resolution computed tomography in accordance with the inventive arrangements is described below. The method assumes that the transfer function due to the finite source size has been experimentally determined.

The target specimen is radiated with a beam of radiation, such as an X-ray or gamma-ray beam. The beam spot size is preferably less than 10 microns in size, for example 1.0 micron. A 2-dimensional data projection of the target object is acquired. A convolution algorithm, with the experimentally determined transfer function, is applied to the 2-dimensional data set. The corrected projection data set is then stored in a suitable memory.

The target specimen is rotated relative to the radiation source a total of 180° plus the angle of the fan beam to reconstruct a 2-dimensional image. Fan beam angle is determined by the position of the radiation source and the detector array. The target is placed within the fan beam.

Either the target can be rotated, the source and detector can be rotated, or both the target, and the source and detector can be rotated. The addition of the fan beam angle on the rotation of the detector is to allow for the inclusion of the entire target specimen within the scan. If scanning was stopped at 180° an image of the entire target cannot generally be produced. The same is true for 3-dimensional reconstructions. If the rotation is less than 180° plus the angle of the fan beam, the target is preferably rotated relative to the source, preferably by one degree or less.

When the target specimen has been fully rotated relative to the source, a cone-beam algorithm can be applied to obtain a 3-dimensional image from the corrected data. The algorithm is preferably a modified tomographic reconstruction algorithm.

The invention is particularly well-suited for application to wood and wood related products. Since the degree of radiation attenuation through a material is known to be a function of the density of the irradiated target material, measurement is possible for the solid material of the cell wall, the air space (vacuole) within each cell and related cell attributes. Referring to FIG. 1, target 16 can be a wood or wood composite specimen. The output of detector 18, preferably being a digital output, permits the formation of reconstructed images of target 16 and allows measurement of various wood-cell attributes, with some or all wood-cell measurements being capable of direct measurement.

FIG. 2 is a table which includes system parameters and resulting system specifications for an X-ray CT system according to an embodiment of the invention that was built and tested. The system was configured to produce an image resolution and minimum detectable feature size dominated by the radiation spot size by using an X-ray source-to-object distance $d_s$ 31 being substantially less (only 5%) compared to the distance between the X-ray source and the detector $d_d$ 32 as shown in FIG. 1. As noted earlier, this relationship generally results in the source spot size becoming the resolution determining factor of the system. As shown in FIG. 2, a 12 $\mu$m spot size produced a 12 $\mu$m image resolution (FWHM resolution) and a 7 $\mu$m minimum detectable feature size. System resolution on the order of 1 $\mu$m is possible through use of a radiation source having a focal spot size on the order of 1 $\mu$m and by adjustment of the system geometry to ensure that the X-ray focal spot size remains the dominant resolution determining system component. Thus, for example, it is expected that system 10 having an X-ray source generating a spot size of 1.0 $\mu$m, can permit resulting FWHM resolution approaching the source spot size of 1.0 $\mu$m.

Figure 3:
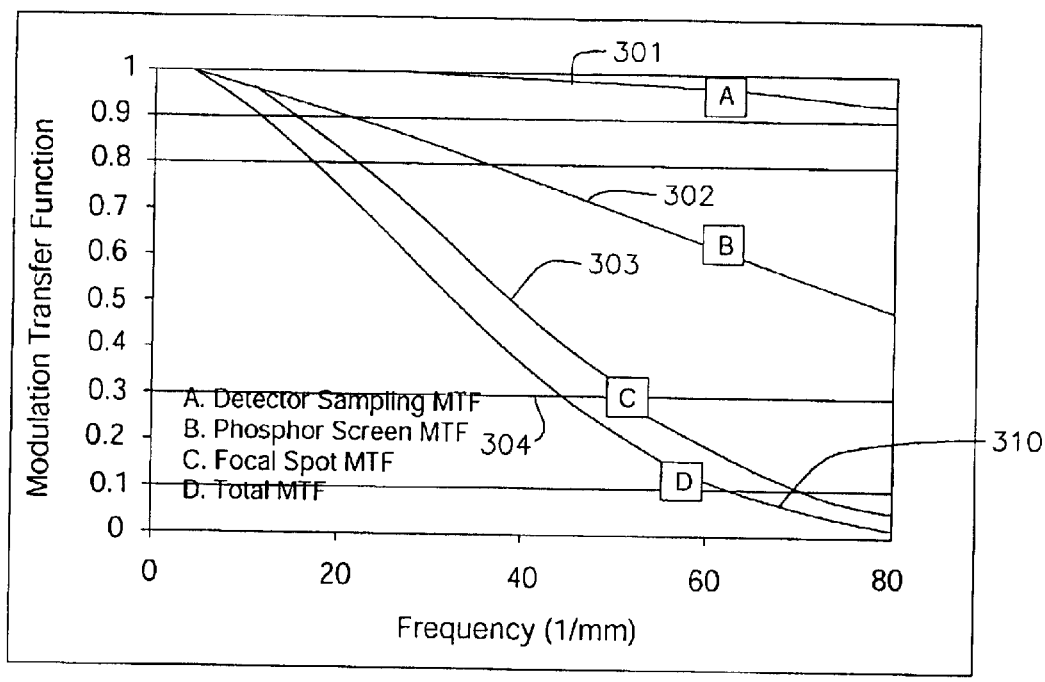
FIG. 3 illustrates modulation transfer functions (MTFs) for the various components of an imaging system, according to an embodiment of the invention.

Image resolution in radiographic systems is generally defined in terms of the "modulation transfer function" (MTF), with the minimum detectable feature size determined at a 10% system MTF. The MTF is essentially the frequency (Fourier) domain representation of the spatial resolution. An advantage of MTF analysis is that multiple contributors to the overall spatial resolution may be analyzed independently, the product of the individual contributors in the frequency domain being the total system MTF. As shown in FIG. 3, contributors to the overall system MTF 304 include the detector sampling MTF 301, the phosphor screen MTF 302 and the focal spot size MTF 303. The total MTF 304 is then the frequency-domain product of the individual components 301, 302 and 303 of the overall system measured at a 10% MTF. As shown in FIG. 3 at point 310, the system resolution is approximately 12 μm, that being the wavelength corresponding to the 10% system MTF.

As shown in FIG. 3, the system resolution is limited primarily by the focal spot size of the radiation source 303 the phosphor screen 302. The use of an X-ray source with a focal spot size of 12 μm and a source-to-target distance ($d_s$) less than the target-to-detector distance ($d_d$) has resulted in the X-ray spot size becoming the dominant component comprising the MTF.

In the configuration described above, system 10 may not be appropriate for imaging larger targets, because of the natural trade-off between resolution and field of view. However, a 2.5 mm field of view is well suited for measurement of features having dimensions in the several micron to hundreds of micron range, such as wood cell length, wood cell width and wood cell wall thickness.

Assuming source 12 is used without improvements in source spot size and detector resolution and the overall system accordingly continues having a resolution of approximately 10 μm, several useful cell dimensions which are generally larger than 10 μm can still be determined directly from the resulting tomographic image. For example, because the cell lumin diameter is generally larger than approximately 10 μm, this cell dimension can be measured directly from the resulting tomographic image.

However, if the resolution of system 10 remains at approximately 10 μm, some useful wood-cell dimensions, such as cell wall thickness, will generally be substantially below the image resolution of system. As a result, these parameters cannot generally be determined directly from the resulting image.

Figure 4:
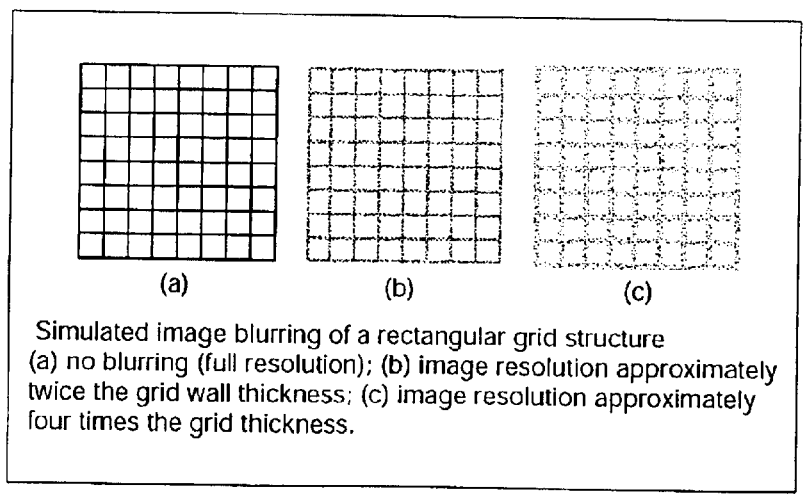
FIGS. 4(a), (b) and (c) illustrate different degrees of image blurring of a rectangular grid structure.

This situation is shown schematically in FIG. 4. FIG. 4(*a*) shows an idealized grid representative of the cellular arrangement of wood where the grid wall is five (5) units wide and the cell spacing is 35 units. FIG. 4(*b*) shows the effect of "blurring" produced by a system with a ten-unit FWHM image resolution. Even though the system resolution (FWHM) is approximately twice that of the cell thickness, direct measurement of the cell wall thickness can still yield reasonable data. FIG. 4(*c*) shows the effect of "blurring" produced by a system with a twenty-unit FWHM image resolution. Direct measurement of the cell wall thickness is not possible in this case. However, the individual cells are clearly resolved and the mean cell wall thickness may be calculated by counting the number of cells per unit area, measuring the mean image density, and employing a prior knowledge of the radio-density of the cell wall.

The following is a step-wise progression of procedures used for measuring cell wall diameter, cell wall thickness, and vacuole diameter indirectly using an X-ray Micro-CT, such as system 10, having as minimum resolution greater than the above cell feature sizes.

1. Micro CT images can be acquired by rotating the radiation source relative to the sample. For example, a rotating-stage micro CT system can be used. The system 10 can have a resolution of approximately 10 μm. The system can use a 1024×1024 element detector with a field of view of 5.5 mm.

2. Reconstruct a 2-dimensional 1024×1024 pixel image slice. Each pixel in the image is 5.4×5.4 microns.

Figure 5:
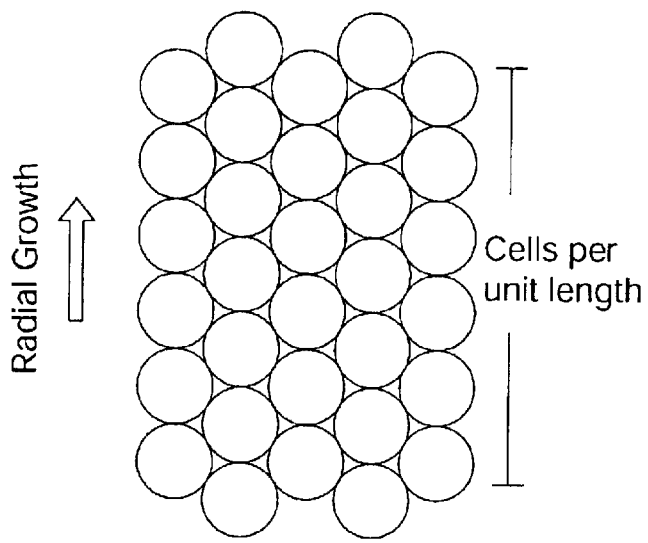
FIG. 5 illustrates the radial orientation of wood-cell size measurements.

3. Determine the number of cells per unit length for approximately a 20 radial cell rows (FIG. 5). Determine mean cell size in this dimension.

Figure 6:
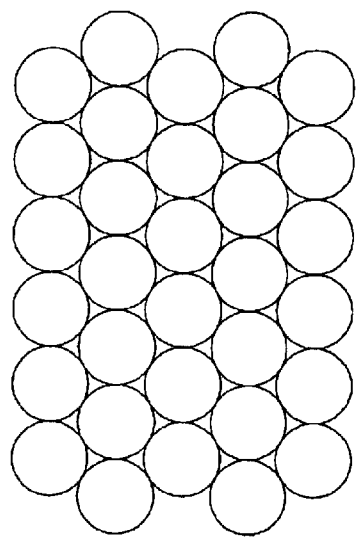
FIG. 6 illustrates the number of tangential rows of cells per unit length.

4. Determine the number of tangential rows per unit length (FIG. 6). Determine mean cell size in this dimension.

Figure 7:
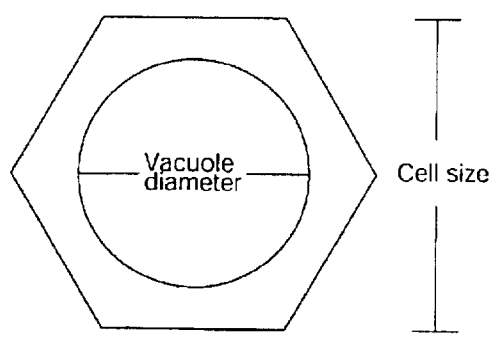
FIG. 7 illustrates a wood-cell modeled as a hexagon having a circular vacuole.

5. Model the wood-cell as a hexagon with an effective size (flat-to-flat) equal to the average of the radial and tangential cell sizes and with a circular vacuole as shown in FIG. 7.

6. Assume the average radio-density ($D_{avg}$) may be expressed as:

$$D_{avg}=(A_v D_v+A_c D_c)/(A_v+A_c),$$

Where $A_v$ is the average vacuole area, $D_v$ is the known radio-density of air, $A_c$ is the average per-cell area of the cellulose cell walls, and $D_c$ is the known radio-density of cellulose. The respective fractional areas of the vacuoles and cellulose can then be solved for.

The system 10 having a field of view of approximately 2.5 mm will generally prevent direct measurement of wood-cell length since wood cell lengths for some tree species used by the forest products industry are typically between 3 and 4 mm. However, estimates of the average cell length may be obtained by counting the number of cell ends per unit length of the cells within the field of view. Estimates can be obtained in both axial and transaxial image slices.

A method for determining wood-cell measurements can begin with trimming a raw sample to a size that fits within the field of view of the X-ray computed tomography system or other three-dimensional imaging system. A 2 or preferably 3 3-dimensional image data set is compiled using X-ray CT or some other imaging method. The average cell size can then be measured using the mean period (in two dimensions) of the cellular structure. The average cell wall thickness can then be determined by measuring the mean density of the sample, calculating the ratio of the cell wall material volume to the lumin material, and fitting the ratio to the measured cell size. The average cell length can be determined by either searching the entire image volume for cell ends and determining the number of cells per unit volume or searching one or more 2D image slices for cells ends and extrapolating to estimate the number of cell ends per unit volume.

The invention may be broadly applied to provide a variety of physical measurements of wood and wood composite products. For example, the invention can be used to determine the uniformity of wood chip orientation and volumetric variation in wood chip orientation in composite materials by performing 2D and 3D Fourier analysis of the image volume. The volumetric variation of the wood-to-resin ratio in composite materials can be determined by measuring the radiation (e.g. X-ray) attenuation coefficients or other elated parameter in composite samples.

Defect density in wood and composite material samples can be determined through image analysis of the X-ray CT or other image data set. For example, wood defects caused by wood destroying insects such as termites or the wood destroying insects themselves can be detected using the invention. The void density in wood or composite materials samples can also be obtained through image analysis of the CT or other image data set.

The volume of moisture uptake in wood or composite material samples can be determined using image analysis of the X-ray CT or other image data set. The invention is also applicable to fiber-resin composite materials.

The computation time associated with the tomographic imaging can be quite short. For example, a high speed detector array can be used to obtain density data in one minute, or less. Second, the computer operating platform could be a UNIX platform on a workstation or to a parallel computer platform.

The inventive arrangements can be used for many purposes other than quickly, directly and non-destructively screening wood and wood products. Indeed, the inventive arrangements can be used for any application requiring non-destructive micron-scale feature imaging. Examples of other kinds of devices and material which can be screened or otherwise inspected and imaged include, without limitation, other kinds of mechanical and electronic components and biological and geological samples.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A method for obtaining wood-cell attributes from cellulose containing samples, comprising the steps of:
   radiating a cellulose containing sample with a beam of radiation, said radiation having an energy capable of passing through said sample;
   collecting radiation attenuation information from said radiation which passes through said sample;
   rotating said source relative to said sample;
   repeating said collecting step after said rotating step;
   forming a projected image from said radiated attenuation information, said image including resolvable features of said sample, and
   determining at least one cell dimension of said sample from said image.

2. The method of claim 1, wherein said at least one cell dimension is selected from the group consisting of cell wall thickness, cell diameter (length) and cell vacuole diameter.

3. The method of claim 1, wherein said image is a tomographical image.

4. The method of claim 1, wherein said sample is wood.

5. The method of claim 1, wherein said sample comprises a reconstituted wood product.

6. The method of claim 5, wherein said reconstituted wood product is at least one selected from the group consisting of strand board, fiber board and fiber-resin wood composite products.

7. The method of claim 1, wherein said resolvable features in said image are less than approximately 100 $\mu$m.

8. The method of claim 1, wherein said resolvable features in said image are less than approximately 20 $\mu$m.

9. The method of claim 1, wherein said resolvable features in said image are less than approximately 5 $\mu$m.

10. The method of claim 1, wherein said resolvable features in said image are less than approximately 2 $\mu$m.

11. The method of claim 1, said resolvable features in said image are less than approximately 1 $\mu$m.

12. The method of claim 1, wherein said image is a 3-dimensional image.

13. The method of claim 1, wherein said radiation is at least one selected from the group consisting of X-rays, gamma rays, neutrons, positrons and electrons.

14. The method of claim 1, further comprising the step of positioning a source of said beam of radiation closer to said target than said target is to a detector used to form said image, wherein a spot size of said beam of radiation primarily determines the resolution provided by said image.

15. A method for sorting cellulose containing products, comprising the steps of:
   radiating a cellulose containing sample with a beam of radiation, said radiation having an energy capable of passing through said sample;
   collecting radiation attenuation information from said radiation which passes through said sample;
   rotating said source relative to said sample;
   repeating said collecting step after said rotating step;
   forming a projected tomographical image from said radiated attenuation information, said tomographical image including resolvable features of said sample, and
   separating said sample into categories based on at least one resolvable feature derivable from said tomographical image.

16. The method of claim 15, further comprising the step of determining at least one cell dimension of said sample from said image.

17. The method of claim 16, wherein said at least one cell dimension is selected from the group consisting of cell wall thickness, cell diameter (length) and cell vacuole diameter.

18. The method of claim 15, wherein said cellulose containing sample is wood.

19. The method of claim 15, wherein said cellulose containing sample is a reconstituted wood product.

20. The method of claim 19, wherein said reconstituted wood product is at least one selected from the group consisting of strand board, fiber board and fiber-resin wood composite products.

21. The method of claim 15, wherein said resolvable features in said image are less than approximately 100 $\mu$m.

22. The method of claim 15, wherein said resolvable features in said image are less than approximately 20 $\mu$m.

23. The method of claim 15, wherein said resolvable features in said image are less than approximately 5 $\mu$m.

24. The method of claim 15, wherein said resolvable features in said image are less than approximately 2 $\mu$m.

25. The method of claim 15, said resolvable features in said image are less than approximately 1 $\mu$m.

26. The method of claim 15, wherein said image is a 3-dimensional image.

27. The method of claim 15, wherein said radiation is at least one selected from the group consisting of X-rays, gamma rays, neutrons, positrons and electrons.

28. A method for detecting wood destroying insect damage, comprising the steps of:
   radiating a cellulose containing sample with a beam of radiation, said radiation having an energy capable of passing through said sample;
   collecting radiation attenuation information from said radiation which passes through said sample;
   rotating said source relative to said sample;
   repeating said collecting step after said rotating step;
   forming a projected tomographical image from said radiated attenuation information, and
   determining whether said sample includes said wood destroying insect damage from said image.

29. The method of claim 28, wherein said wood destroying insect damage is from a termite.

30. The method of claim 28, wherein said cellulose containing sample is wood.

31. The method of claim 28, wherein said sample is a reconstituted wood product.

32. The method of claim 29, wherein said reconstituted wood product is at least one selected from the group consisting of strand board, fiber board and fiber-resin wood composite products.

33. The method of claim 28, wherein resolvable features in said image are less than approximately 100 $\mu$m.

34. The method of claim 28, said resolvable features in said image are less than approximately 1 $\mu$m.

35. The method of claim 28, wherein said image is a 3-dimensional image.

36. The method of claim 28, wherein said radiation is at least one selected from the group consisting of X-rays, gamma rays, neutrons, positrons and electrons.

37. A system for obtaining physical features from cellulose containing samples, comprising:

a radiation source for radiating a cellulose containing sample with a beam of radiation, said radiation having an energy capable of passing through said sample;

a radiation detector for collecting radiation attenuation information from said radiation which passes through said sample;

structure for rotating said source relative to said sample, wherein a projected tomographical image is formed from said radiated attenuation information, said tomographical image including resolvable features of said sample, and structure for determining at least one cell dimension of said sample from said image.

38. The system of claim 37, wherein said at least one cell dimension is selected from the group consisting of cell wall thickness, cell diameter (length) and cell vacuole diameter.

39. The system of claim 37, wherein said cellulose containing sample is wood.

40. The system of claim 37, wherein said cellulose containing sample comprises a reconstituted wood product.

41. The system of claim 37, wherein said reconstituted wood product is at least one selected from the group consisting of strand board, fiber board and fiber-resin wood composite products.

42. The system of claim 37, wherein said system can resolve features in said image which are less than approximately 100 $\mu$m.

43. The system of claim 37, wherein said system can resolve features in said image which are less than approximately 20 $\mu$m.

44. The system of claim 37, wherein said system can resolve features in which said image are less than approximately 5 $\mu$m.

45. The system of claim 37, wherein said system can resolve features in said image which are less than approximately 2 $\mu$m.

46. The system of claim 37, wherein said system can resolve features in said image which are less than approximately 1 $\mu$m.

47. The system of claim 37, wherein said image is a 3-dimensional image.

48. The system of claim 37, wherein said radiation is at least one selected from the group consisting of X-rays, gamma rays, neutrons, positrons and electrons.

* * * * *